Patented Oct. 8, 1929

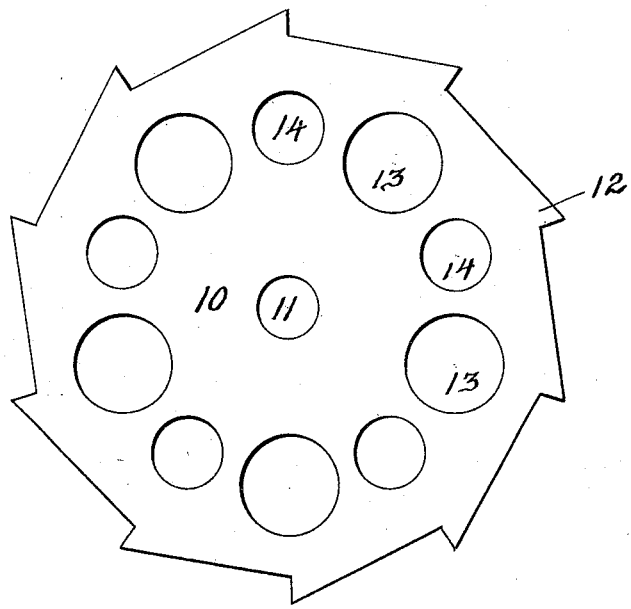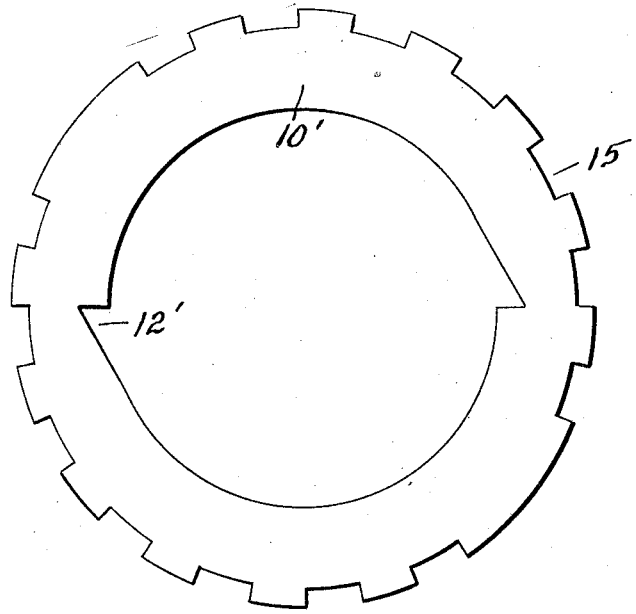

1,730,672

UNITED STATES PATENT OFFICE

ROBERT J. McNEILL, OF HOPKINTON, IOWA

DROPPING PLATE FOR CORN PLANTERS

Application filed August 16, 1926. Serial No. 129,508.

An object of this invention is to provide improved means for differentiating the number of kernels of corn to be planted in alternate hills in a row without changing the dropping plate.

My invention consists in the construction, arrangement and combination of elements hereinafter set forth, pointed out in my claims and illustrated by the accompanying drawing, in which—

Figure 1 is a plan or face view of a dropping plate employing circular holes and peripheral driving means.

Figure 2 is a plan or face view of a dropping plate employing single kernel, edge-selection dropping means and internal driving devices or means.

In the construction of the device as shown in Figure 1, a dropping plate 10 is formed with a central opening 11, whereby it may be pivoted in the bottom of a seed box, and also is formed with ratchet teeth 12 on its periphery, whereby it may be driven rotatively in a common manner. The dropping plate 10 also is formed with an annular row of circular holes concentric with its axis, the centers of said holes preferably being in the same orbit. Substantially one-half of the holes, 13, are of materially larger diameter than the remainder of said holes, 14, and alternate therewith.

The holes 14 are adapted to receive and drop a specified number of kernels or seeds, such as one, two or three, while the holes 13 are adapted to contain and drop a larger number of seeds or kernels such as two, three or four as compared with the holes 14. That is to say, in a given plate, the holes would be arranged to drop one and two, two and three, three and four, respectively.

In the construction of the device as shown in Figure 2, the plate 10' preferably is of annular form and provided with ratchet notches 12' on its axially inner margin, whereby it can be rotated. The plate 10' is formed with cells 15 of equal size and equally spaced apart in its periphery and each of said cells is adapted to receive a single kernel of corn by edge selection therein. The cells are arranged in groups, in this instance seven in number, and the groups are spaced apart a distance equal to three times the width of a cell at each end. The operating means is adjusted to drive the plate throughout the range of four cells, in this instance, so that said plate will drop four kernels of corn in one operation and three kernels of corn alternately therewith, for the reason that the fourth cell in the second operation is omitted and presents no kernel of corn. The plate may be arranged to drop one and two, two and three or three and four, or any desired number of kernels varying by one.

The plate also can be constructed for other variation, such as one, two or three and two, three and four in combination, by omitting or rearranging the positions of the cells.

I claim as my invention—

1. A dropping plate for planters automatically operable to drop a different number of seeds in adjacent hills and the same number of seeds in alternate hills, said plate comprising a disc portion formed with a central pivot hole and marginal means adapted for engagement with elements whereby the disc may be rotated and an annular row of holes having their centers in an orbit concentric with said pivot hole, adjacent holes in said row being of different size and alternate holes in said row being of the same size.

2. In a dropping plate for planters having a central pivot hole and marginal means adapted for engagement with elements whereby said plate may be rotated, means automatically operable to drop a different number of seeds in adjacent hills and the same number of seeds in alternate hills, said means comprising an annular row of holes in said plate having their centers in an orbit concentric with said pivot hole, adjacent holes in said row being of different size and alternate holes in said row being of the same size.

Signed at Monticello, in the county of Jones, and State of Iowa, this 30th day of July, 1926.

ROBERT J. McNEILL.